United States Patent [19]

Acampora et al.

[11] Patent Number: 4,602,274
[45] Date of Patent: Jul. 22, 1986

[54] IYQY FORMAT TELEVISION SIGNAL ENCODING AND DECODING APPARATUS

[75] Inventors: Alfonse Acampora, Staten Island, N.Y.; Robert J. Petri, Montgomery Township, Mercer County, N.J.

[73] Assignee: RCA Corporation, Princeton, N.J.

[21] Appl. No.: 565,286

[22] Filed: Dec. 27, 1983

[51] Int. Cl.$^4$ .................... H04N 9/42; H04N 9/32
[52] U.S. Cl. ................................ 358/11; 358/13
[58] Field of Search ............... 358/11, 13, 16, 12, 358/310, 14

[56] References Cited

U.S. PATENT DOCUMENTS

| | | | |
|---|---|---|---|
| 2,811,578 | 10/1957 | Rieke | 358/37 X |
| 3,781,463 | 12/1973 | Van den Bussche | 358/12 |
| 4,084,181 | 4/1978 | Mita et al. | 358/12 |
| 4,163,247 | 7/1979 | Bock et al. | 358/12 |
| 4,215,369 | 7/1980 | Iijima | 358/146 |
| 4,245,235 | 1/1981 | Poetsch | 358/14 |
| 4,335,393 | 6/1982 | Pearson | 358/310 |

*Primary Examiner*—Michael A. Masinick
*Assistant Examiner*—Michael P. Dunnam
*Attorney, Agent, or Firm*—Joseph S. Tripoli; George E. Haas; George J. Seligsohn

[57] ABSTRACT

Encoding apparatus, situated at the transmitter and employing digital processing, transforms an NTSC format color television signal to a serial time-multiplexed IYQY format which (1) preserves the blanking level of the NTSC signal, and (2) time compresses the color information in a manner which permits low-distortion restoration of the NTSC format color signal by decoding apparatus, situated at the receiver and employing digital processing. The transformed format is particularly suitable for communication over a DBS (direct-broadcast satellite).

22 Claims, 13 Drawing Figures

IYQY FORMAT TELEVISION SIGNAL ENCODING AND DECODING APPARATUS

This invention relates to encoding apparatus and decoding apparatus for transforming a television signal originally in composite NTSC format into a predetermined serial IYQY time-multiplexed format television signal, and then restoring this time-multiplexed format back into composite NTSC format.

There are disadvantages in transmitting a color television signal in NTSC format over a satellite communication system. These disadvantages arise from the fact that (1) the signal-to-noise ratio of a satellite communication system (particularly a Direct Broadcast Satellite system) is relatively low; (2) the noise power spectrum with respect to signal frequency of a frequency-modulated signal is parabolic, so that the noise level at higher signal frequencies is quite high; and (3) all of the chrominance information component of an NTSC television signal (which television signal frequency modulates a microwave carrier of the satellite communication system) phase modulates the relatively high 3.58 MHz color carrier frequency situated near the upper end of the television signal band, where the noise power of the frequency modulated microwave carrier is high. Moreover, more of the frequency-modulation sideband power of the chrominance component lies outside of the bandwidth of the satellite transponder than would be the case if the chrominance component were positioned closer to the lower end of the television signal band. The consequent effect is to lower both the fidelity and signal-to-noise ratio of the chrominance component of a received NTSC television signal communicated by satellite.

In the near future, Direct-Broadcast-Satellites (DBS) will be coming into use. DBS will broadcast directly to the homeowner who will employ a relatively small, low-gain antenna to receive signals from the satellite. The problem of low signal-to-noise ratio is a much more severe problem in a DBS receiver than is the case of an earth-station receiver employing a large, high-gain antenna.

A general solution to the aforesaid problem is to transform an NTSC format television signal at the transmitter into a more suitable format, and frequency-modulate the microwave carrier transmitted to the satellite with the transformed format television signal. At the receiver, the transformed-format television signal is restored to NTSC format. One known approach is to convert a 3.58 MHz color carrier of the NTSC format to a substantially lower (and, therefore, less noisy) color carrier frequency (a so-called "buried carrier"). This has the beneficial effect of positioning more (but not all) color-signal frequency-modulation sideband energy within the bandwidth of the satellite transponder. Another known approach is to do away with the color carrier altogether, by transforming an NTSC format into a serial time-multiplexed format in which the respective chrominance and luminance information of each horizontal scan-line period of the transformed format occupies separate and distinct portions of each horizontal scan-line period thereof. The present invention makes use of this latter approach.

In order to squeeze both serial time-multiplexed luminance and chrominance information into the time interval of a horizontal scan-line period, part of the time occupied by the horizontal blanking interval of the NTSC format must be used. Even then, at least one of the chrominance and luminance information must be time compressed. Thus, some of the information available in an NTSC format television signal is thrown away at the transmitter in the transformation process and, therefore, is unavailable at the receiver. This is a price that has to be paid for the benefits gained by transmitting a serial, time-compressed transformed-format television signal, rather than an NTSC format television signal to a receiver over a satellite communication system. The predetermined serial IYQY time-multiplexed format television signal having characteristics provided by the encoding apparatus of the present invention significantly reduces the price to be paid for using a serial, time-compressed transformed format signal, while retaining the gained benefits of such a transformed format over an NTSC format.

Briefly, in accordance with the principles of the present invention, each horizontal scan-line period interval is divided into 910 sampling periods, each of which sampling periods is equal to $\frac{1}{4}$ of an NTSC color-carrier period. Each horizontal scan-line period includes (1) a short sync pulse comprised of the leading edge and a fractional part of a standard-length NTSC horizontal sync pulse, the short sync pulse having a length equal to a first given integral number of sequential sample periods, and (2) luminance (Y) video and front porch samples situated within the time interval occupied by the "Y and C (chrominance) active video+front porch" interval of an NTSC horizontal scan-line period, the Y active video and front porch samples being comprised of a second given integral number of sequential sample periods. Each of alternate ones of the horizontal scan-line periods further includes a flag pulse immediately following the short sync, a first guard immediately following the flag pulse, a set of time-compressed I (in-phase) samples immediately following the first guard, and a second guard immediately following the set of time-compressed I samples and immediately preceding any Y active video and front porch samples of that alternate horizontal scan-line period. The flag pulse has a given level above the given blanking level of the original NTSC format television signal and has a length equal to a third given number of sequential sample periods. The first and second guards have a level substantially equal to the given blanking level and have lengths equal respectively to fourth and fifth given numbers of sequential sample periods. The set of time-compressed I samples have respective levels above the given blanking level and are comprised of a sixth given integral number of samples occupying sequential sample periods, with respective levels of the time-compressed I samples corresponding to a first set comprised of successive levels of C that occur during each of every 2nth (where n is a given integer) sample period of the active video portion of that alternate horizontal scan-line period. Each remaining horizontal scan-line period includes a third guard immediately following the short sync, a set of time-compressed Q (quadrature) samples immediately following the third guard, and a fourth guard immediately following the set of time-compressed Q samples and immediately preceding the Y active video and front porch samples of that remaining horizontal scan-line period. The third guard has a level substantially equal to the given blanking level and has a length equal to the sum of the third and fourth given integral numbers of sequential sample periods. The fourth guard has a level substantially equal to the given blanking level and has a level equal to the fifth given integral number of sequential sample periods. The set of time-compressed Q samples has respective levels above the given blanking level and is comprised of the sixth given integral number of samples occupying the sequential sample periods, with the respective levels of time-compressed Q samples corresponding to a second set comprising successive levels of C that occur during each of every 2nth sample period of the active video portion of that remaining horizontal scan-line period. Further, the second set of 2nth period is phase displaced with respect to the first set 2nth sample period by solely one sample period.

Using the Y, C and timing and control information contained in a received transformed serial IYQY format television signal having the characteristics set forth above, it is possible for a relatively simple and inexpensive decoder situated at the receiver to regenerate the original NTSC format television signal with a high degree of fidelity.

The characteristics of a composite NTSC color television signal are known in the art. These characteristics include a phase-modulated color-carrier frequency $f_{CC}$ component which is frequency multiplexed with a baseband luminance component during the active video portion of each horizontal scan-line period. The color carrier frequency $f_{CC}$ has a value of approximately 3.58 MHz and each successive horizontal scan-line period has a length equal to 227.5 periods of the color carrier frequency $f_{CC}$. Besides the active video portion thereof, successive horizontal scan-line periods include a standard length horizontal sync pulse preceded by a front porch and followed by a back porch. The front porch is at a given blanking level; the horizontal sync pulse extends below this given blanking level; and the back porch includes a color burst with a reference phase of frequency $f_{CC}$ that is superimposed on the given blanking level. The leading edge of the horizontal sync pulse precisely defines the beginning of each successive horizontal scan-line period.

Figure 1A:
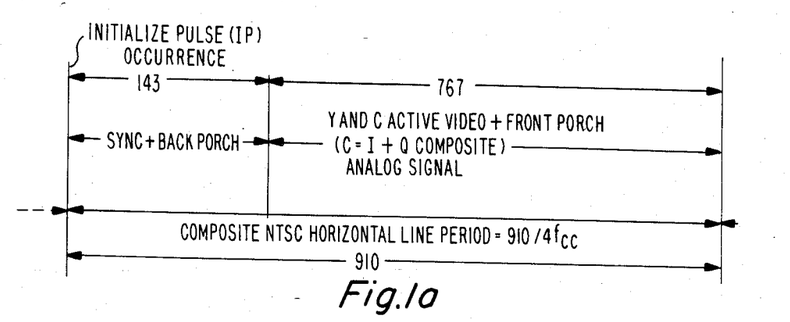
FIGS. 1a and 1b schematically illustrate the format of a composite NTSC format horizontal scan-line period and a preferred embodiment of a transformed serial IYQY format of two successive horizontal scan-line periods in accordance with the principles of the present invention.

FIG. 1a schematically illustrates a single horizontal scan-line period, extending from the leading edge of one sync pulse the leading edge of the next following sync pulse. The present invention makes use of a sampling frequency having a period equal to $\frac{1}{4}$ the period of the color carrier frequency $f_{CC}$. Since a horizontal scan-line period is equal to 227.5 periods of the color carrier frequency, the scan-line period is equal to 910 sampling periods of $4f_{CC}$ (as indicated in FIG. 1a). As further indicated in FIG. 1a, the first 143 sampling periods of each horizontal scan-line period are occupied by the sync pulse and the back porch. The remaining 767 sampling periods thereof are occupied by the active video portion followed by the front porch which precedes the sync pulse of the next following horizontal scan-line period. The active video portion is comprised of baseband luminance (Y) and phase-modulated color-carrier chrominance (C), simultaneously-occurring, frequency-multiplexed signals. As indicated in FIG. 1a, the phase-modulated C signal is a composite of a signal formed of the vector sum of in-phase (I) and quadrature (Q) components.

Figure 1B:
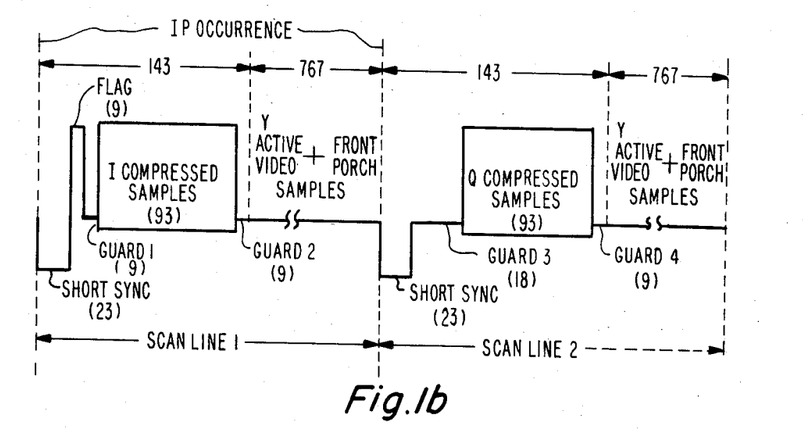

In accordance with the present invention, successive horizontal scan-line periods each having the NTSC format shown in FIG. 1a, are transformed into a predetermined serial IYQY time-multiplexed format of the type shown in FIG. 1b. FIG. 1b shows two successive horizontal scan-line periods, indicated, respectively, as "scan-line 1" and "scan-line 2". The first 143 sample periods of scan line 1 consist of a short sync pulse of 23 sample periods, followed by a flag pulse of 9 sample periods, followed by a guard 1 of 9 sample periods, followed by 93 I compressed samples each occupying a sample period, followed by a guard 2 of 9 sample periods. The first 143 sample periods of scan line 2 are comprised of a short sync pulse of 23 sample periods, followed by a guard 3 of 18 sample periods, followed by 93 Q compressed samples each occupying a sample period, followed by a guard 4 of 9 sample periods. Guards 1, 2, 3 and 4 all have the same given blanking level as that had by the untransformed original NTSC scan-line period. However, a short sync pulse of each of scan lines 1 and 2, which has a level below this given blanking level, is comprised of the leading edge and only a fractional part of the untransformed standard-length NTSC sync pulse (which has a length substantially greater than 23 sample periods). The flag pulse and the I compressed samples of scan line 1 have a level above the given blanking level and the Q compressed samples of scan line 2 also have a level above the given blanking level. Further, the Y active video+front porch samples, which occupy the latter 767 sample periods of each of scan line periods 1 and 2, have a level above the given blanking level. It is a television signal having the transformed serial IYQY format shown in FIG. 1b that is transmitted from a transmitter to a receiver over a satellite communication system.

Figure 2A:
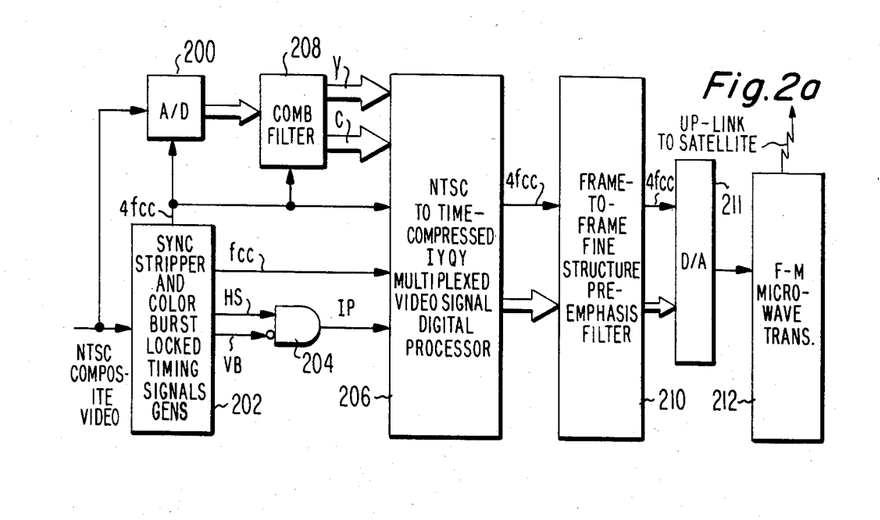
FIGS. 2a and 2b, respectively, are block diagrams of illustrative examples of the transmitter portion and the receiver portion of a television-signal satellite communication system, which respective transmitter and receiver examples incorporate apparatus embodying the present invention.
Figure 2B:
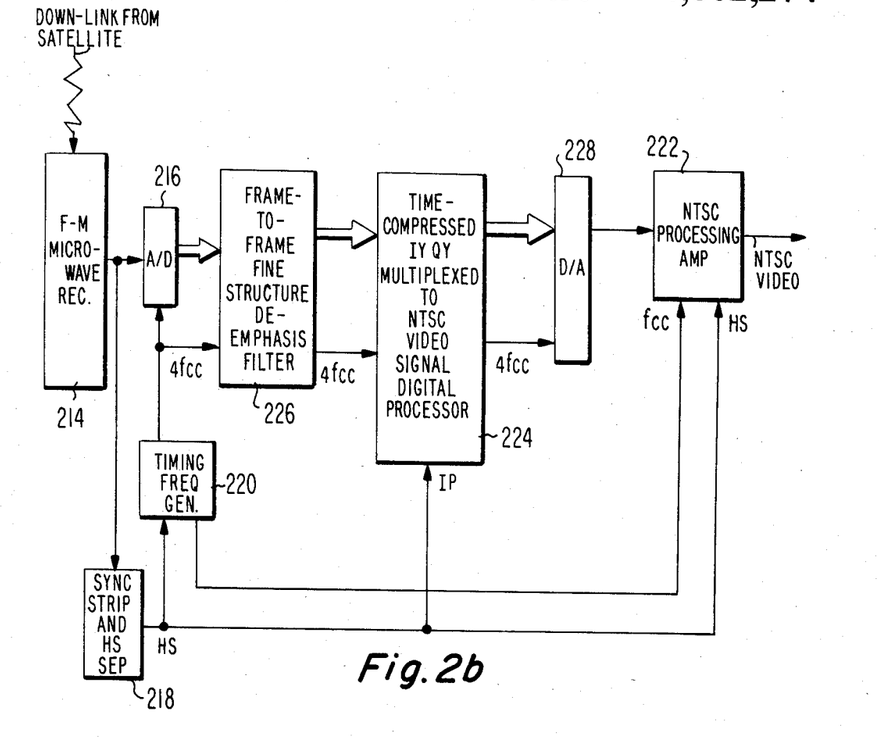

Examples of such a transmitter and such a receiver are shown in FIGS. 2a and 2b, respectively. Referring to FIG. 2a, an NTSC composite video signal, at the tramsitter, is applied as an input to both analog-to-digital converter (A/D) 200 and to sync stripper and color burst locked timing signal generators 202. Block 202 includes a phase-locked oscillator arrangement, responsive to the phase of the color burst of the NTSC composite video input, for deriving a continuous wave color carrier frequency $f_{CC}$ at the reference phase of the color burst, and also deriving a sampling frequency of $4f_{CC}$ that is phase locked to the color carrier frequency. Further, block 202, in response to the horizontal and vertical sync signals of the NTSC composite video input, derives a signal HS defining the leading edge of each horizontal sync pulse of the NTSC composite video input and a signal VB defining the vertical blanking interval of the NTSC composite video input. Signals HS and VB are applied as respective inputs to decoder gate 204 to produce as an output initializing pulse IP. Specifically, the inputs to gate 204 are such that in the absence of a vertical blanking interval, an IP signal is produced in response to each and every HS signal (i.e., no IP is produced during a vertical blanking interval). The sampling frequency, the color carrier and the IP signal are applied as respective inputs to NTSC to time-compressed IYQY multiplexed video signal digital processor 206, which includes the encoding apparatus of the present invention. The sampling frequency is also applied as an input to A/D 200 and to a digital comb filter 208. A/D 200 samples the level of the NTSC composite video at the $4f_{CC}$ clock rate and converts each sample to a multibit (e.g., eight) binary representation thereof. As is known, comb filters take advantage of the fact that Y information on each of two successive scan lines is relatively in phase with another, while the C information information is relatively 180° degrees out of phase with one another, to separate the Y information from the C information. The separated Y and C information, in digital form, from comb filter 208 is applied as respective inputs to processor block 206.

The time-compressed IYQY multiplexed video signal from digital processor 206 is applied to digital-to-analog (D/A) converter 211 preferably through digital frame-to-frame fine structure pre-emphasis filter 210. The $4f_{CC}$ sampling frequency is applied to both filter 210 and D/A converter 211. Although filter 210 is not essential to the practice of the present invention, its use is highly desirable in a satellite communication system (especially a DBS system) for reducing (in cooperation with a de-emphasis filter at the receiver) the effect of transmission-path noise. Preferably, such pre-emphasis and de-emphasis filters are structurally of the form disclosed in detail in the co-pending patent application Ser. No. 565,285 of Acampora, et al., filed on even date herewith and assigned to the same assignee as the present application. In any case, regardless of whether filter 210 is included or excluded, the output from D/A 211, which constitutes the transformed serial IYQY format of FIG. 1b, is applied as a modulating signal to F-M microwave transmitter 212, and is then transmitted as an up-link to the transponder of a satellite.

The down-link from the transponder of the satellite is received by F-M microwave receiver 214 in FIG. 2b. The output from receiver 214, which has the transformed serial IYQY format shown in FIG. 1b, is applied as an input to A/D 216 and to sync stripper and HS separator 218. Block 218, in response to the leading edge of each short sync pulse, derives an HS signal that defines the time of occurrence of each successive leading edge. The HS signal from block 218 comprises a time base for the receiver, which time base is synchronized with the timing of the transmitter. Other timing signals in the receiver are derived from the HS signal. In particular, the HS signal is applied as a synchronizing input to timing frequency generator 220, which includes such means as a voltage-controlled oscillator and frequency dividers arranged in a phase-locked loop for deriving successive sampling periods at the sampling frequency of $4f_{CC}$ in synchrony with the occurrence of successive HS signals, so that exactly 910 sampling periods occur during each successive horizontal scan line period defined by the interval between the occurrence of two successive HS signals. The timing frequency generator 220 also generates a continuous wave color carrier frequency $f_{CC}$ in synchrony with both the HS signal and the sampling frequency. Color carrier $f_{CC}$ and the HS signal are applied as control inputs to NTSC processing amplifier 222, discussed in more detail below. The HS signal is also applied as an initialized pulse (IP) to time-compressed IYQY multiplexed to NTSC video signal digital processor 224, which includes the decoder of the present invention. The sampling frequency $4f_{CC}$ is also applied as respective inputs to A/D 216, frame-to-frame fine structure de-emphasis filter 226, digital processor 224, and D/A 228.

A/D 216 samples the output from receiver 214 at a rate of $4f_{CC}$ and converts the level of each sample to multi-bit (e.g., eight) binary representation thereof. The digital output from A/D 216 is applied as an input to digital processor 224 preferably through de-emphasis filter 226. Although de-emphasis filter 226 is not essential to the present invention, its inclusion, along with pre-emphasis filter 210, is desirable for reasons discussed above. De-emphasis filter 226 may have the structure discussed in detail in the aforesaid co-pending (Ser. No. 565,285) patent application.

The output from digital processor 224, which comprises in digital form the Y and C active video samples in NTSC format, is converted to analog form by D/A 228 and is appied as a signal input to NTSC processing amplifier 222. Amplifier 222 may be a standard processing amplifier, of the type employed in television studios and the like, which, in response to applied color carrier and HS sync information, derives, with the appropriate relative timing, the NTSC standard-length sync pulse and color burst during the sync+back porch interval of a composite NTSC horizontal line period. The output from amplifier 222 is a complete NTSC format color television signal.

Figure 3:
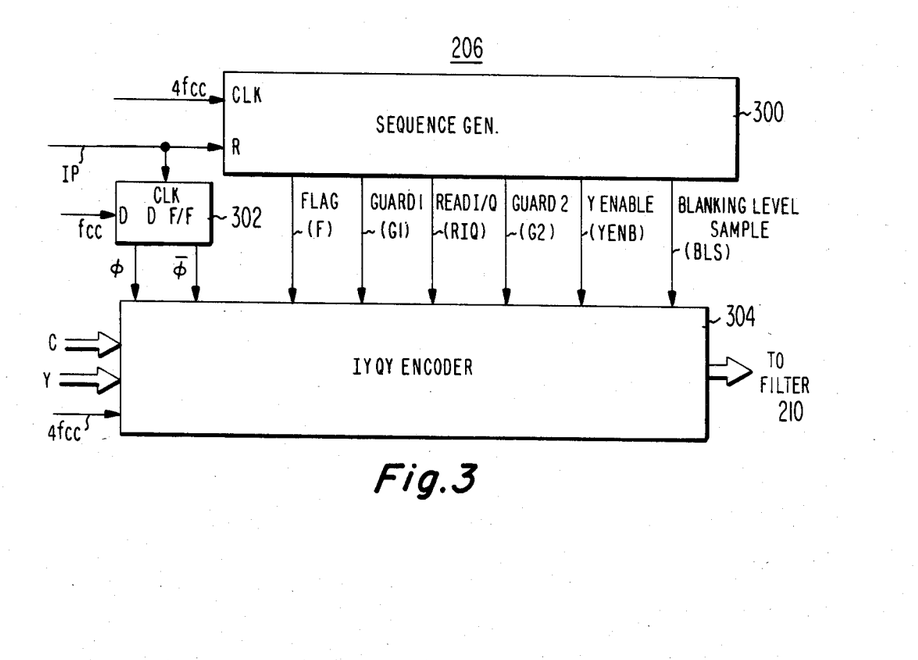
FIG. 3 is a block diagram structurally illustrating the NTSC time-compressed IYQY multiplexed video signal digital processor of FIG. 2a in more detail.

As discussed above in connection with FIG. 2a, NTSC to time-compressed IYQY multiplexed video signal digital processor 206 includes the encoder of the present invention. More specifically, as shown in FIG. 3, digital processor 206 is comprised of sequence generator 300, D flip-flop 302, and IYQY encoder 304. Sequence generator 300 includes a counter responsive to the sampling frequency $4f_{CC}$ applied to it clock (CLK) input for counting 910 sequential sampling periods. This counter is reset at the beginning of each horizontal scan-line period in response to an initializing pulse IP applied to its reset (R) input. Sequence generator 300 further includes appropriate gates coupled to the counter thereof for deriving, as respective outputs therefrom, a plurality of control signals which are applied as respective inputs to IYQY encoder 304. As indicated in FIG. 3, the respective control signals are comprised of flag (F), guard 1 (G1), read I/Q (RIQ), guard 2 (G2), Y enable (YENB), and blanking level sample (BLS). As indicated in the timing diagram of FIG. 3a, YENB occupies both the first 23 sampling periods and the last 767 sampling periods of the 910 sampling periods comprising a scan line (i.e., YENB occupies the entire interval starting with the 143rd sampling period of one horizontal scan line and extends to the end of the first 23 sampling periods of the next horizontal scan line). Further, F occupies 9 sampling periods beginning with sampling period 23, G1 occupies 9 sampling periods beginning with sampling period 32, RIQ occupies 93 sampling periods beginning with sampling period 41, and GS occupies 9 sampling periods beginning with sampling period 134. In addition, BLS, which is only one sampling period long, occupies sampling period 904 (which occurs during the front porch portion of an NTSC format horizontal scan line).

D flip-flop 302 has the color carrier $f_{CC}$ applied to its data (D) input and the initializing pulse IP applied to its clock input. In response thereto, phase signal $\phi$ is high and phase signal $\bar{\phi}$ is low during alternate horizontal scan lines, while $\phi$ is low and $\bar{\phi}$ is high during the remaining horizontal scan lines. Both $\phi$ and $\bar{\phi}$ are shown as applied as inputs to IYQY encoder 304 (although they provide redundant phase information so that only one of the two is essential).

IYQY encoder 304 further has the Y and C digital signals from filter 208 applied as inputs thereto and also has sampling frequency $4f_{CC}$ applied as inputs thereto. The preferred embodiment of encoder 304 is shown in FIG. 4.

Figure 4:
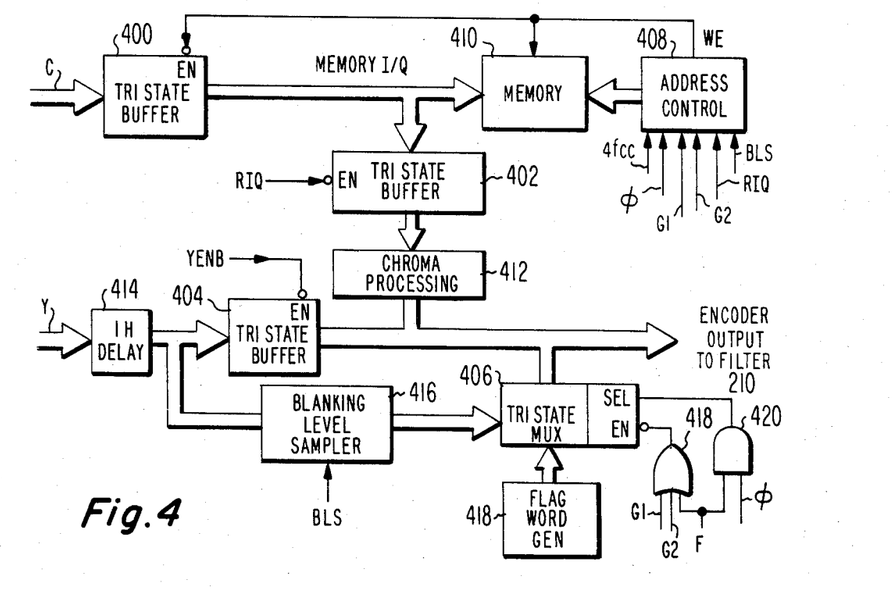
FIG. 4 illustrates a structural embodiment of the IYQY encoder of FIG. 3.

FIG. 4 includes tri-state buffers 400, 402 and 404 and tri-state multiplexer (MUX) 406. Each of these elements is a commercially available device, which is capable of transferring a multibit binary signal from its input to its output only if its enabling (EN) control is low. If EN is high, the output thereof is decoupled from the input thereof by a high impedance (effecting an open circuit). For this reason, each of elements 400, 402, 404 and 406 are shown as having respective control signals applied to the EN control thereof through an inverter (schematically designated by a small circle at the EN control).

Tri-state buffer 400 is enabled by a write enable (WE) control signal from address control being applied to the EN control thereof. This permits the C digital output from comb filter 208 to be applied through buffer 400 as an input to memory 410, which at this time is placed in its write mode by the presence of the WE signal applied as a control input thereto. Address control 408, which is shown in greater detail in FIG. 5, applies multi-bit address information to memory 410 for storing each of successive I/Q applied C samples at sequential address locations within memory 410.

Figure 5:
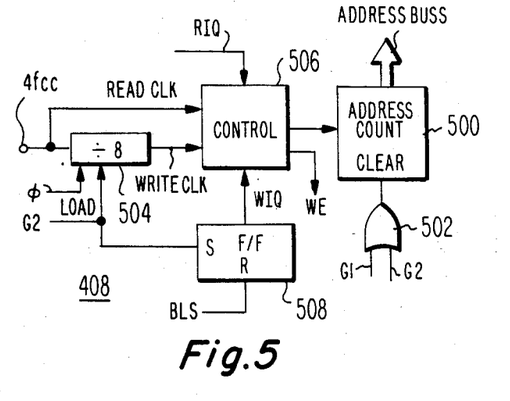
FIG. 5 illustrates a preferred embodiment of the address control of FIG. 4.
Figure 5A:
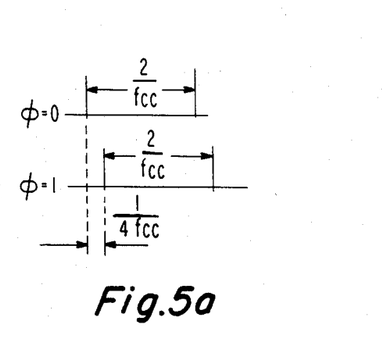
FIG. 5a is a timing diagram helpful in explaining the generation of the write clock of FIG. 5.

As indicated in FIG. 4, address control 408 is responsive to the $4f_{CC}$ sampling frequency, the $\phi$ phase signal and the G1, G2, RIQ and BLS control signals applied as respective inputs thereto. As indicated in FIG. 5, address control 408 includes an address counter 500, which is cleared in response to either G1 or G2 control signals being applied to the clear input thereof through OR gate 502. Further, in response to the G2 control signal, the binary value of the phase signal $\phi$ is loaded into divide-by-eight 504. The $4f_{CC}$ sampling frequency is applied directly as a read clock to control 506. Further the $4f_{CC}$ sampling frequency is applied through divide-by-eight 504 as a write clock to control 506. Therefore, the write clock, which occurs at only one-eighth the sampling frequency $4f_{CC}$, has a period of $2/f_{CC}$. However, as indicated in FIG. 5a, the write clock when $\phi$ has the binary value one, is phase displaced by one sampling period of $\frac{1}{4}f_{CC}$ with respect to the write clock when $\phi$ has the binary value zero. In this way, the color components on successive lines have respective quadrature displacement. Note that the respective phase values of I (in-phase) and Q (quadrature phase) are not necessarily the NTSC standard values. All that is essential is that the relative phase difference therebetween be substantially 90°.

Figure 3A:
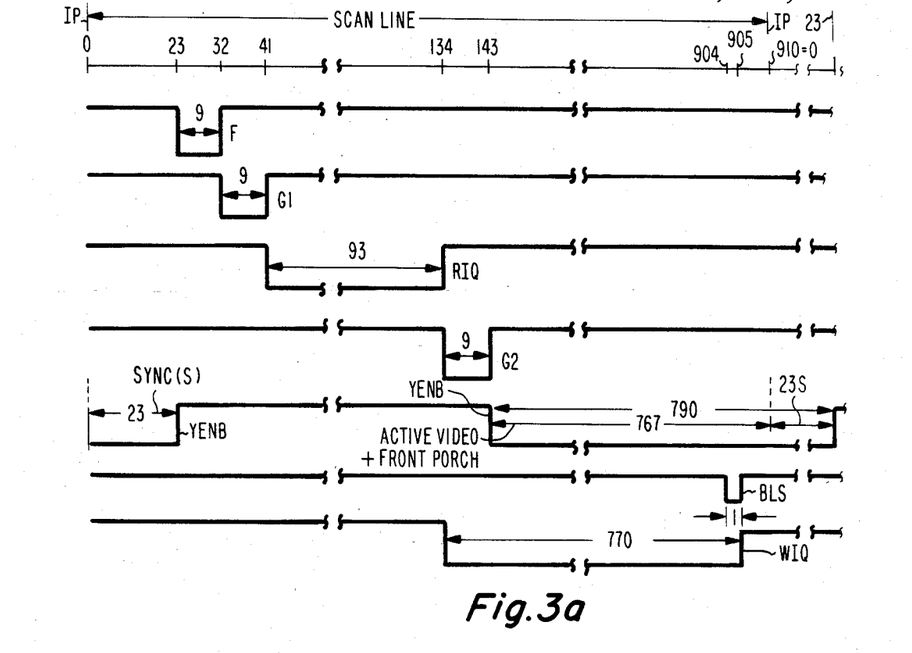
FIG. 3a comprises respective timing diagrams of control signals generated directly or indirectly by the sequence generator of FIG. 3.

Flip-flop 508 is set in response to the G2 control signal being applied to its set (S) input and is reset in response to the BLS control signal being applied to its reset (R) input. The output from flip-flop 508 is a write I/Q (WIQ) control signal which is applied as a first control input to control 506. As indicated in FIG. 3a, the WIQ control signal occurs for 770 sampling periods beginning with sampling period 134. The WIQ control signal is applied as a second control input to control 506.

During the presence of WIQ, a write clock is forwarded by control 506 as the clock input being counted by address counter 500. During the presence of RIQ the read clock is forwarded by control 506 as the clock input to address counter 500. Address counter 500, after being cleared, counts the number of clocks applied thereto and then applies this count, in binary form, over its bus to memory 410 as indicated in FIG. 4.

Control 506 also produces as an output the WE control signal, discussed above in connection with FIG. 4. The WE control signal is in the form of successive pulses occurring at the relatively slow write clock frequency of $f_{CC}/2$.

Referring to FIGS. 3a and 4 again, it is seen that the interval of the WIQ signal includes the interval of the active video, so that a signal one out of each successive set of eight consecutive C samples, occurring during the active video portion of each horizontal scan-line is written into memory 410 and stored at each of consecutive address locations thereof. This results in a total of 93 C samples being stored in memory 410. During the 93 sample period interval of RIQ of the next-occurring horizontal scan-line period, these 93 samples are read out, in order, at the sampling-frequency rate of $4f_{CC}$ and applied through then-enabled tri-state buffer 402 and chroma processing 412 to the encoder output that is coupled to filter 210 of FIG. 2a.

While chroma processing 412 is desirable, it is not essential. Specifically, chroma processing 412 is used to modify the chroma samples for such a purpose as increasing the chroma signal-to-noise ratio at the receiver. For instance, since the chroma dynamic range is substantially less than the luminance dynamic range, it might be helpful to increase the dynamic range of the chroma samples. This can be accomplished by such linear means as amplification or by such non-linear means as companding, by way of example.

The Y samples from comb filter 208 (FIG. 2a) are delayed by one horizontal scan-line period by 1 H delay 414. During the YENB interval, during which tri-state buffer 404 is enabled, the delayed Y samples are forwarded to the encoder output to filter 210. Further, during the BLS sampling period, which occurs during the front porch portion of the NTSC format television signal, delayed Y samples are sampled by blanking level sampler 416 (which is a sample-and-hold circuit). Blanking level sampler 416 applies the given blanking level held thereby as a first input to tri-state MUX 406. Flag word generator 418 applies a binary word representing a predetermined level above the given blanking level as a second input to tri-state MUX 406. Tri-state MUX 406 is similar to tri-state buffers 400, 402 and 404, except for the fact that tri-state MUX 406, when enabled, selectively couples one of its two inputs to its output in accordance with whether its select (SEL) control is high or low. The blanking level from sampler 416 input is forwarded to the encoder output in response to SEL control being low and the flag word input is forwarded to the encoder output in response to the SEL control being high. Tri-state MUX 406 is enabled in response to any of the G1, G2, and F control signals being applied to the EN control thereof through OR gate 418. The SEL control is normally low, and is rendered high by an output from AND gate 420 that occurs in the presence of the F control signal solely during those alternate horizontal scan-line periods in which the phasing signal $\phi$ is 1 (high).

Based on the above description of FIGS. 3, 3a, 4, 5 and 5A, it is apparent that the encoder output to filter 210 corresponds with the transformed serial IYQY format shown in FIG. 1b. It is further apparent that during scan line 1 of FIG. 1b (which can be designated an IY component horizontal scan-line period), the 93 I compressed samples correspond to a first set comprised of successive levels of C that occur during each of every eighth sample period of the active video portion of the immediately preceding NTSC format horizontal scan-line period and which I samples have been delayed by a fraction of a scan-line period to occupy thereby the back-porch position of a scan line shown in FIG. 1b. The Y component relative position in the scan line remains unchanged, since it is delayed a full scan line by 1 H delay 414. Similarly, it is apparent that during scan line 2 of FIG. 1b (which can be designated a QY component horizontal scan-line period) the 93 Q compressed samples shown in FIG. 1b correspond to a second set comprised of successive levels of C that occur during each of every eighth sample period of the active video portion of the immediately preceding NTSC format horizontal scan-line period, while the Y samples thereof again have been delayed one full scan line by 1 H delay 414. In addition, it is apparent that the second-set eighth sample period is phase displaced with respect to the first-set eighth sample periods by solely one sample period of $\frac{1}{4}f_{CC}$.

In the preferred embodiment of the encoder, discussed above, the compression ratio is eight-to-one. This permits each of the compressed I samples and Q samples to just fit into the interval of 143 sample periods occupied by the sync+back porch of a composite NTSC format televison signal. A lower compression ratio would require that the Y samples also be compressed. On the other hand, unnecessary loss of color information would result from a compression ratio more than eight-to-one. Nevertheless, the present invention contemplates a compression ratio of 2 n (where n is any given integer). In this case, if n is an odd integer, it is necessary to invert the polarity of every other sample.

Figure 6:
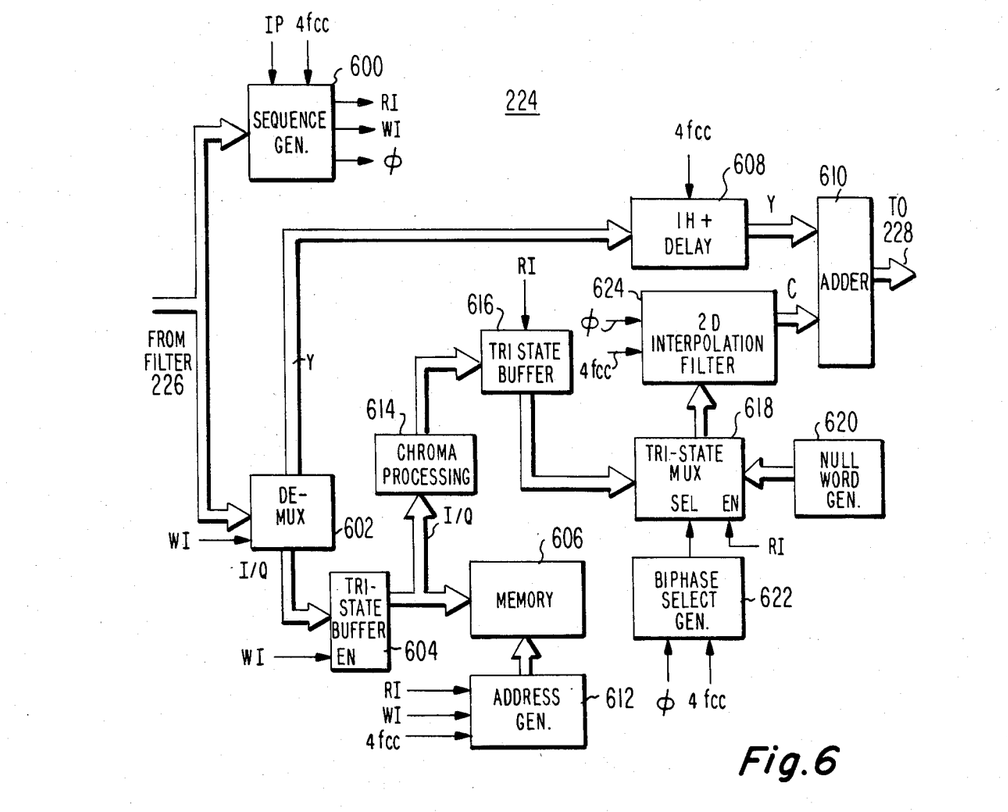
FIG. 6 illustrates a preferred embodiment of the structure of the time-compressed IYQY multiplexed to NTSC video signal digital processor of FIG. 2b.
Figure 7:
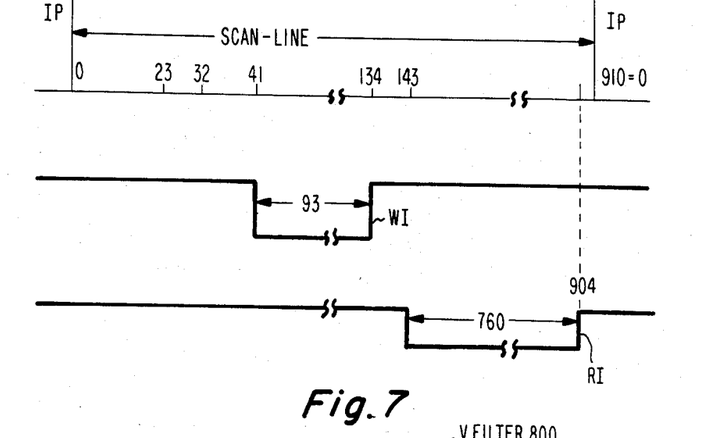
FIG. 7 is a timing diagram of two respective control signals generated by the sequence generator of FIG. 6.

Time-compressed IYQY multiplexed to NTSC video signal digital processor 224 of the receiver shown in FIG. 2b, is shown in more detail in FIG. 6. Referring to FIG. 6, the digital output from filter 226 is applied as an input to both sequence generator 600 and demultiplexer 602. Sequence generator 600, like sequence generator 300 described above, includes a counter for counting 910 sampling periods of the sampling frequency of $4f_{CC}$. The counter is reset at the beginning of each horizontal scan-line period by initialize pulse IP. Sequence generator 600 further includes means for providing a phase signal $\phi$ for distinguishing between IY horizontal scan-line periods and QY horizontal scan-line periods. In particular, sequence generator 600 includes a detector for detecting the presence of a flag word during the 9 sequential sampling periods beginning with sampling period 23, which designates an IY scan-line period. In response to such detection the phase signal $\phi$ has a first binary value during such an IY horizontal scan-line period. During a QY horizontal scan-line period (indicated by the absence of a detected flag word), the phase signal $\phi$ has a second binary value. Further, as indicated in the timing diagram of FIG. 7, sequence generator 600 includes gates coupled to the counter thereof for deriving a write interval (WI) control signal during the 93 sampling periods beginning with sampling period 41, and for deriving a read interval (RI) during the 760 sample periods beginning with sample period 143.

During the WI interval of a horizontal scan-line period, in which either the I compressed samples or the Q compressed samples are applied to demultiplexer 602 from filter 226, demultiplexer 602 forwards the signals from filter 226 through tri-state buffer 604 as an input to memory 606. During all of the remaining portion of the horizontal scan-line period (when the WI control signal is not present) demultiplexer 602 forwards the output from filter 226 (which now comprises the Y information) through delay 608, discussed below, as a first input to adder 610.

Address generator 612, which has the WI and RI control signals and the $4f_{CC}$ sampling frequency applied as inputs thereto, is effective during the write interval in storing each of the 93 I or the 93 Q time-compressed samples applied thereto through buffer 604 at sequential address locations thereof. The sequential addresses are applied to memory 606 from address generator 612 at the sampling frequency rate of $4f_{CC}$. During the read interval, address generator 612 causes each of the stored samples in memory 606 to be read out at the rate that memory 606 is addressed by address generator 612. Address generator 612, like address generator 408, includes means for dividing the $4f_{CC}$ sampling frequency by eight during the read interval, so that each read out sample from memory 606 occupies eight consecutive $\frac{1}{4}f_{CC}$ sampling periods, as indicated in diagram 900 of FIG. 9.

The read out samples from memory 606 are applied through chroma processing 614 and tri-state buffer 616 to a first input of tri-state multiplexer 618. Chroma processing 614, like chroma processing 412, is not essential and may be omitted. However, if chroma processing 412 is employed in the encoder, chroma processing 614 has a characteristic opposite to (effectively cancels) the processing done by chroma processing 412.

Null word generator 620 applies a null word (i.e., a binary representation of zero) as a second input to tri-state multiplexer 618. Tri-state multiplexer 618, which is enabled during the read interval, has the output of bi-phase select generator 622 applied to its SEL control. Bi-phase select generator 622 includes a divide-by-eight means, similar to that shown in FIG. 5, that is responsive to the binary value of the phase signal $\phi$ and the sampling frequency $4f_{CC}$ for producing a high output from biphase select generator 622 only during a selected ordinal one of each set of eight consecutive sampling periods shown in diagram 900 of FIG. 9. In accordance with the binary value of the phase signal $\phi$, the respective selected ordinal sampling periods during IY scan lines and QY scan lines are phase displaced from one another by solely one sampling period. In principal, the selected sampling period of either the IY or QY scan line can occupy any one of each set of eight consecutive sampling periods shown in diagram 900 of FIG. 9. However, in practice, it is desirable that neither selected sample period, be the first or the last (sampling period one or eight) of a set, in order to avoid transient effects that occur when the sample values from memory 606 are changing.

Figure 9:
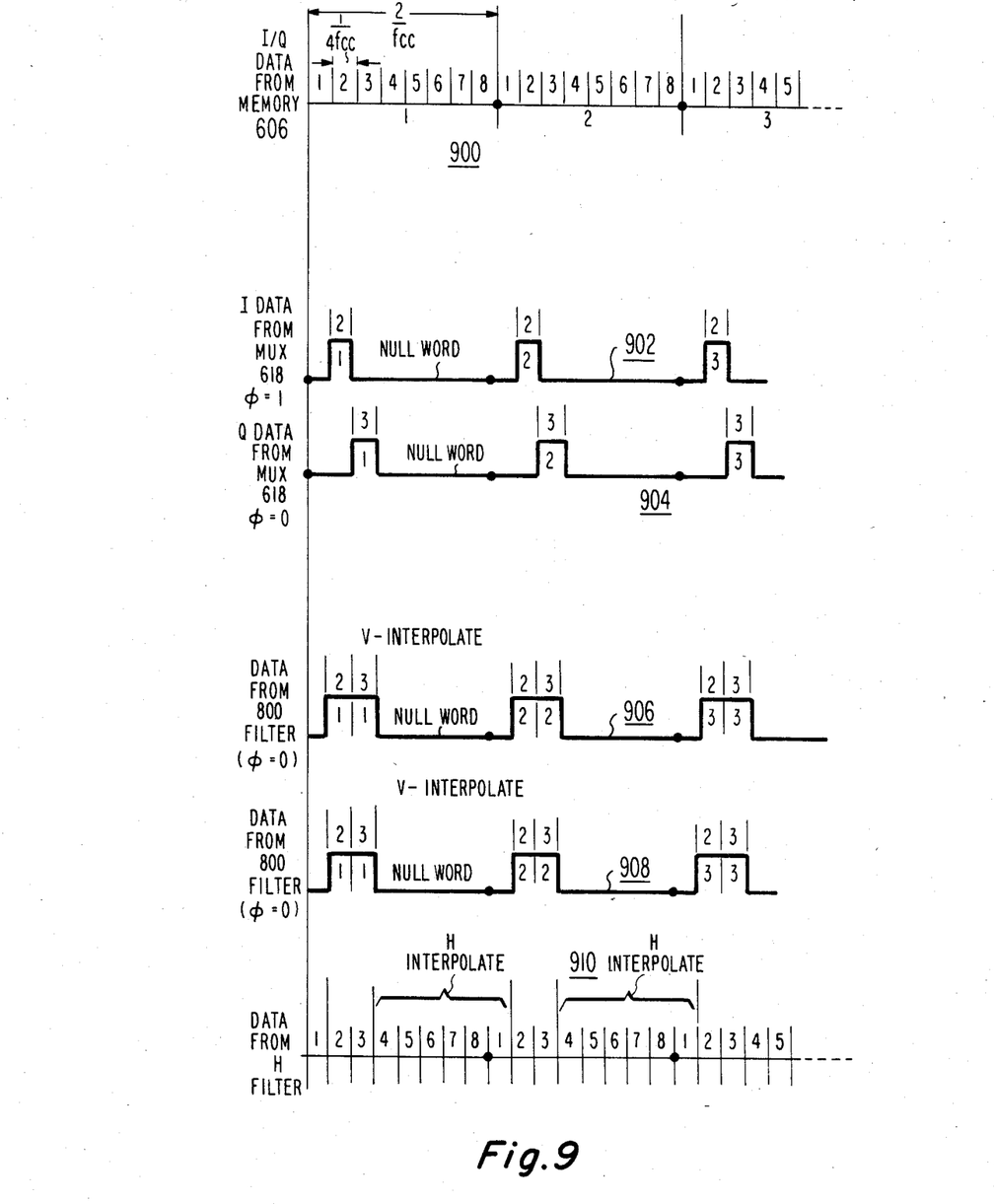
FIG. 9 contains respective timing diagrams helpful in explaining the operation of biphase select generator, the tri-state multiplexer and the 2D interpolation filter of FIG. 6.

Respective diagrams 902 and 904 of FIG. 9 schematically illustrate the output from tri-state MUX 618 during an IY scan line and during a QY scan line (assuming that biphase select generator 622 selects sampling period 2 during an IY scan line and selects sampling period 3 during a QY scan line).

Figure 8:
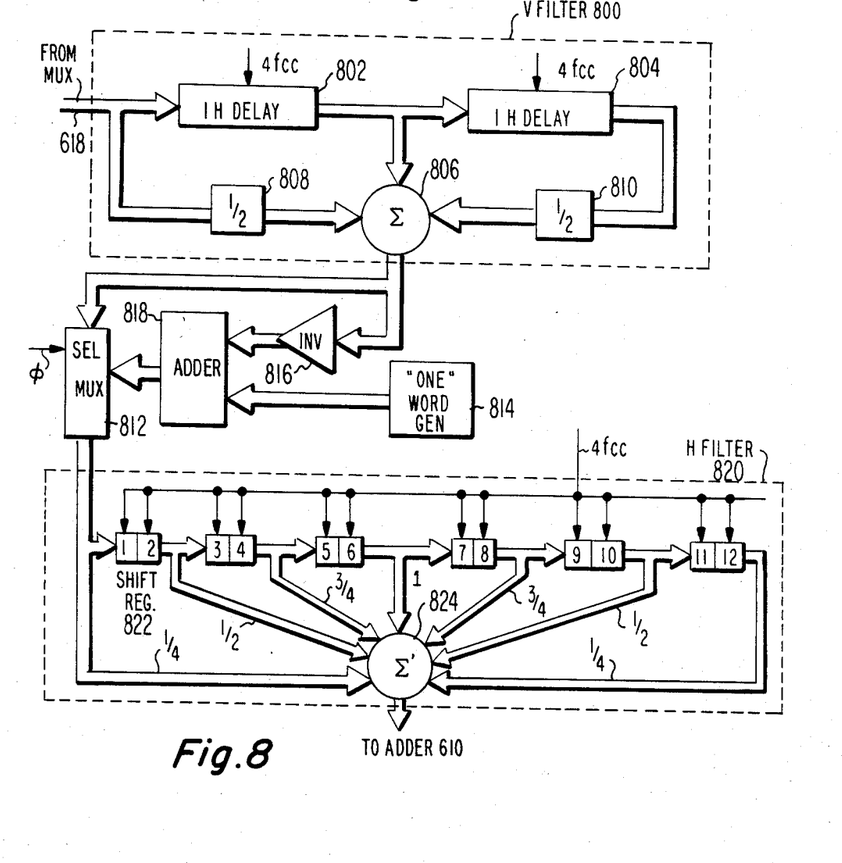
FIG. 8 illustrates an embodiment of the structure of the 2D interpolation filter of FIG. 6.

The output from tri-state multiplexer, the phasing signal $\phi$, and the sampling frequency $4f_{CC}$ are applied as inputs to two dimensional (2D) interpolation filter 624, which is shown in detail in FIG. 8.

Referring to FIG. 8, there is shown a vertical (V) filter 800 comprised of serially-connected delays 802 and 804, each providing a delay of one horizontal scan-line period. Each of delays 802 and 804 may comprise a shift register having 910 stages, each of which corresponds to a separate sample. Successive samples from the output of multiplexer 618 are applied as an input to delay 902. V filter 800 is further comprised of a summer ($\Sigma$) circuit 806 and divide-by-two weighting circuits 808 and 810. The successive digital samples from MUX 618 is divided by two by element 808 and applied as a first input to summer 806. The digital output from delay 802 is applied a second input to summer 806 and the digital output of delay 804 is divided by two by element 810 and applied as a third input to summer 806. As indicated in diagrams 906 and 908, during both IY and QY scan-lines, the output of V filter 800 includes sample data during sample periods 2 and 3 and null word data during sample periods 1, 4, 5, 6, 7 and 8 of each set of eight consecutive sample periods. In particular, during IY scan lines, interpolated Q samples are associated with actual (non-interpolated) I samples. However, because of the one-sample-period phase displacement between I samples and Q samples, there is absolutely no mixing at all of I sample information with Q sample information. The situation is the same during each QY scan line, except that, in this case, interpolted I samples are associated with actual (non-interpolated) Q samples.

As is known, NTSC format requires that the color carrier on successive scan lines be phase inverted with respect to one another. To accomplish this function, the output of summer 806 of V filter 800 is applied directly to one input of multiplexer 812 and is also applied through a digital inverter (made up of "one" word generator 814, inverter 816 and adder 818) to a second input of multiplexer 812. Phasing signal $\phi$ is applied to the SEL control of multiplexer 812, so that the output therefrom corresponds to one of its inputs during one scan line and the other of its inputs during the next scan line.

The output of multiplexer 812 is applied to a horizontal (H) filter 820 comprised of a twelve-stage shift register 822. Shift register 822 is shifted at the sampling frequency of $4f_{CC}$, as indicated. Summer circuit ($\Sigma'$) 824 includes seven inputs thereto originating respectively from the output from MUX 812, and the respective outputs of stages 2, 4, 6, 8, 10 and 12 of shift register 822.

As indicated schematically, the respective outputs from multiplexer 812 and stage 12 of register 822 are weighted by $\frac{1}{8}$, the respective outputs from stages 2 and 10 are weighted by $\frac{1}{2}$, the respective outputs of stages 4 and 8 are weighted by $\frac{3}{4}$, while the entire output from stage 6 of shift register 822 is applied as an input to summer 824.

As indicated in diagram 910 of FIG. 9, the output from summer 824 (which applies the C input to adder 610) fills in sample periods 1, 4, 5, 6, 7 and 8 of each set of eight consecutive sample periods with interpolated values.

In FIG. 8, both the vertical and horizontal filters use weighting functions that provide linear interpolation. However, if desired, other non-linear interpolating weighting function can be used instead.

Returning to FIG. 6, delay 608 provides a delay equal to somewhat more than one horizontal scan line that is comprised of 910 sample periods plus six additional sample periods. The purpose of this is to ensure that the Y component experiences a delay just equal to the delay experienced by the C component passing through interpolation filter 624. Therefore, the Y component samples of the restored NTSC format, appearing on output of delay 608 and applied as a first input to adder 610, occurs in substantially exact time registration with the corresponding C component samples of the restored NTSC format, appearing at the output of filter 624 and applied as a second input to adder 610. Thus, the output of adder 610 yields, in digital form, the restored NTSC signal that is applied through digital processor 224 to D/A 228 in FIG. 2b.

As discussed above, the compression ratio need not be eight, but may have any value 2 n (where n is a given integer). In those cases where n is an odd number, it is necessary that interpolation filter 624 include means for effectively inverting the polarity of alternate C samples.

What is claimed is:

1. Encoding apparatus for transforming a television signal originally in composite NTSC format into a predetermined serial IYQY time-multiplexed format television signal, wherein said composite NTSC format is comprised of successive horizontal scan-line periods each consisting of a "sync+back porch" portion followed by a "Y and C active video+front porch" portion, said "sync+back porch" portion being comprised of a standard length horizontal sync pulse extending below a given blanking level followed by a back porch at said given blanking level on which a color burst at frequency $f_{cc}$ is superimposed, the leading edge of said standard sync pulse defining the beginning of each successive horizontal scan-line period, and said front porch of said "Y and C active video+front porch" portion being at said given blanking level; said encoding apparatus comprising:

first means responsive to the leading edge of each of said NTSC successive standard-length horizontal sync pulses (1) for dividing each of successive horizontal scan-line periods into 910 sequential sample periods, each sample period being $\frac{1}{4}$ the period of $f_{cc}$, and (2) for designating alternate ones of successive horizontal scan-line periods as IY horizontal-scan-line periods and the remaining ones of successive horizontal scan-line periods as QY horizontal-scan-line periods;

second means for filtering said NTSC format television signal during each of said successive horizontal scan-line periods into separate C and Y components; and third means coupled to said first and second means for deriving as said predetermined serial IYQY time-multiplexed format a serial IY time-multiplexed television signal component having a first predetermined format during each horizontal scan-line period designated as an IY horizontal scan-line period and for deriving a serial QY time-multiplexed television signal component having a second predetermined format during each horizontal scan-line period designated as a QY horizontal scan-line period;

wherein both said first and second predetermined formats of said IY and QY components include (1) a short sync pulse comprised of the leading edge and a fractional part of said standard-length NTSC sync signal, said short sync pulse having a length equal to a first given integral number of sequential sample periods, and (2) Y active video and front porch samples situated within the time interval occupied by the "Y and C active video+front porch" portion of the NTSC horizontal scan-line period, said Y active video and front porch samples being comprised of a second given integral number of sequential sample periods;

wherein said first predetermined format of an IY component further includes a flag pulse immediately following said short sync, a first guard immediately following said flag pulse, a set of time-compressed I samples immediately following said first guard, and a second guard immediately following said set of time-compressed I samples and immediately preceding any Y active video and front porch samples of that IY component horizontal scan-line period, said flag pulse having a given level above said given blanking level and having a length equal to a third given number of sequential sample periods, said first and second guards having a level substantially equal to said given blanking level and having lengths equal respectively to fourth and fifth given integral numbers of sequential sample periods, and said set of time-compressed I samples having respective levels above said given blanking level and being comprised of a sixth given integral number of samples occupying sequential sample periods, with the respective levels of said set of time-compressed I samples corresponding to a first set comprised of successive levels of C that occur during each of every 2nth (where n is a given integer) sample period of the active video portion of an IY component horizontal scan-line period; and wherein said second predetermined format of an QY component includes a third guard immediately following said short sync, a set of time-compressed Q samples immediately following said third guard, and a fourth guard immediately following said set of time-compressed Q samples and immediately preceding said Y active video and front porch samples of that QY component horizontal scan-line period, said third guard having a level substantially equal to said given blanking level and having a length equal to the sum of said third and fourth given integral numbers of sequential sample periods, said fourth guard having a level substantially equal to said given blanking level and having a length equal to said fifth given integral number of sequential sample periods, and said set of time-compressed Q samples having respective levels above said given blanking level and being comprised of said sixth given integral number of samples occupying sequential sample periods, with the respective levels of said set of time-compressed Q samples corresponding to a second set comprised of successive levels of C that occur during each of every 2nth sample period of the active video portion of a QY component horizontal scan-line period, said second-set 2nth sample period being phase displaced with respect to said first-set 2nth sample period by solely one sample period.

2. The encoding apparatus defined in claim 1, wherein:

the time occupied by said second given number of sequential sample periods is substantially equal to the time occupied by said second "Y and C active video+front porch" portion of a composite NTSC format horizontal scan-line period; and the time occupied by the sum of said first, third, fourth, fifth, and sixth sequential sample periods is substantially equal to the time occupied by said "sync+back porch" portion of a composite NTSC format horizontal scan-line period.

3. The encoding apparatus defined in claim 2, wherein:

said first given integral number is 23, said second given integral number is 767, said third given integral number is 9, said fourth given integal number is 9, said fifth given integral number is 9, and said sixth given integral number is 93.

4. The encoding apparatus defined in claim 2, wherein n is 2.

5. Decoding apparatus to transform a received serial IYQY time-multiplexed television signal having said predetermined format defined in claim 1 into a composite NTSC format; said decoding apparatus comprising:

fourth means responsive to said short sync pulses of said received television signal for dividing each of successive horizontal scan-line periods into 910 sequential sample periods, each sample period being ¼ the period of $f_{cc}$;

fifth means coupled to said fourth means and responsive to the presence of said flag pulse in said received television signal during said third given number of sequential sample periods immediately following a short sync pulse of a horizontal scan-line period for degignating that horizontal scan-line period an IY horizontal scan-line period, and responsive to the absence of said flag pulse in said received television signal during said third given number of sequential sample periods immediately following a short sync pulse of a horizontal scan-line period for designating that horizontal scan-line period a QY horizontal scan-line period;

sixth means coupled to said fourth and fifth means that (1) is operative during each IY horizontal scan-line period for expanding the set of time-compressed I samples into a set of corresponding expanded I samples that occur each of every 2nth sampling period of the active video portion of that IY horizontal scan-line period occupied by the samples thereof, and (2) is operative during each QY horizontal scan-line period for expanding the set of time-compressed Q samples into a set of corresponding expanded Q samples that occur each of every 2nth sampling period of the active video portion of that QY horizontal scan-line period occupied by the samples thereof, said set of corresponding expanded Q samples of a QY horizontal scan-line period being phase displaced with respect to said set of corresponding expanded I samples of an IY horizontal scan-line period by solely one sample period; and seventh means coupled to said sixth means and responsive to both of said respective sets of corresponding I and Q expanded samples for inserting vertically and horizontally interpolated I and Q samples in each of the sequential sampling periods that occur between the sampling periods occupied by said expanded samples of each of said IY and of said QY horizontal scan-line periods.

6. The decoding apparatus defined in claim 5, wherein said predetermined format of said received serial IYQY time-multiplexed television signal was generated by said encoding apparatus defined in claim 1.

7. A system incorporating a digital encoder for transforming a television signal originally in composite NTSC format into a predetermined serial IYQY time-multiplexed format television signal, said system comprising:

first means including a sync stripper and color burst locked timing signals generator that is responsive to said composite NTSC television signal being applied thereto for deriving (1) an initializing pulse IP in synchronism with the leading edge of horizontal sync pulses of said applied NTSC television signal, (2) the color carrier frequency $f_{cc}$ of said applied NTSC television signal, and (3) a sampling signal frequency $4f_{cc}$ that is phase locked to said color carrier and that defines a sampling period equal to 1/910 of a horizontal scan-line period of said NTSC television signal;

an analog-to-digital converter, operating at said sampling signal frequency $4f_{cc}$ and responsive to said composite NTSC television signal being applied thereto for deriving samples of the level of said applied NTSC television signal at intervals of $\frac{1}{4}f_{cc}$;

a digital comb filter responsive to said digital samples from said analog-to-digital converter for deriving separate luminance Y and chrominance C digital samples; and an NTSC to time-compressed multiplexed video signal digital processor including sequence generating and phasing means and said digital encoder, said processor coupled to said first means and to said comb filter for deriving digital samples of said predetermined serial IYQY time-multiplexed format television signal in response to said color carrier $f_{cc}$, said sampling signal $4f_{cc}$, said initializing pulses IP, and said luminance Y and chrominance C samples being applied thereto, said sequence generating and phasing means (a) deriving from the 910 $\frac{1}{4}f_{cc}$ sample periods of a horizontal scan-line period interval between successive initializing pulses IP a plurality of different control signal intervals and (b) deriving a phasing signal $\phi$ for designating alternate ones of said horizontal scan-line periods IY horizontal scan-line periods and for designating remaining ones of said horizontal scan-line periods QY horizontal scan-line periods.

8. The system defined in claim 7, wherein:

said plurality of different control signals generated by said sequence generating and phasing means include a flag (F) control signal, a guard 1 (G1) control signal, a read I/Q (RIQ) control signal, a guard 2 (G2) control signal, a Y enable (YENB) control signal, and a blanking level sample (BLS) control signal;

said YENB control signal only occupies those sampling periods of a horizontal scan-line period that occur during an initial fractional portion of the horizontal sync pulse and during the active video portion plus the front porch portion of an NTSC format horizontal scan-line period;

said F, G1, RIQ, and G2 control signals, in that order, occupy the remaining sampling periods of a horizontal scan-line period; and BLS control signal occupies a given sampling period that occurs during the front porch portion of an NTSC format horizontal scan-line period.

9. The system defined in claim 8, wherein said digital encoder comprises:

a memory for storing C samples successively written therein at successive addresses thereof;

memory control means having said sampling signal frequency $4f_{cc}$, said phasing signal $\phi$ and said control signals G1, G2, RIQ, and BLS applied thereto (1) for permitting every 2nth C sample (where n is a given integer) occurring from the end of said RIQ until the beginning of said BLS control signals to be successively written in said memory at said successive addresses thereof, each of the respective 2nth C samples of a QY horizontal scan-line period being phase displaced by solely one sampling period with respect to each of said respective 2nth C samples of an IY horizontal scan-line periods, and (2) for reading out from said memory each of said C samples stored at each of said successive addresses thereof during each successive sampling period that occurs during the presence of an RIQ control signal to thereby time compress said read-out C samples;

means effective during the presence of said RIQ control signal for forwarding said time-compressed C samples to the output from said encoder;

means effective during the presence of said YENB control signal for forwarding said Y samples to the output from said encoder;

a blanking level sampler for storing the blanking level defined by the sample that occurs during the given sampling period in which said BLS control signal is present;

a flag word generator; and means effective during the presence of said G1 and G2 control signals and also during the presence of an F control signal of a QY horizontal scan-line period for forwarding said stored blanking level sample to the output of said encoder, and effective during the presence of an F control signal of an IY horizontal scan-line period for forwarding said flag word to the output of said encoder.

10. The system defined in claim 9, wherein said means for forwarding said time-compressed C samples includes a chroma processor having given characteristics for modifying the respective levels defined by said C samples in accordance with said given characteristics.

11. The system defined in claim 9, wherein:

said YENB control signal occupies sampling periods 1–23 and 143–910 of a horizontal scan-line period;

said F, G, RIQ, and G2 control signals respectively occupy sampling periods 24–32, 33–41, 42–134, and 135–143 of a horizontal scan-line period;

said BLS control signal occupies sampling period 904 of a horizontal scan-line period; and n is equal to four.

12. The system defined in claim 9, further including: means inserted between said comb filter and the output of said digital decoder for providing a one horizontal scan-line period delay of said Y samples.

13. The system defined in claim 7, wherein said sync stripper of said first means includes means for detecting the occurrence of the vertical blanking VB interval of said NTSC television signal, and said first means includes gate means for preventing the derivation of IP during the presence of VB.

14. The system defined in claim 7, further including a digital-to-analog converter responsive to the output of said digital encoder for deriving said predetermined IYQY format in analog form.

15. A system including a digital decoder for transforming a received encoded IYQY format television signal into an NTSC format television signal, wherein said IYQY format is comprised of alternately received IY and QY horizontal scan-line periods each of which is initiated by the leading edge of a sync pulse and is the same length as an NTSC format horizontal scan-line period, wherein each of both said IY and QY horizontal scan-line periods includes a time-compressed C component that occurs during a given portion thereof and a Y component that occurs during the remaining portion thereof, and wherein only each of said IY horizontal scan-line periods includes a flag pulse for distinguishing between IY and QY horizontal scan-line periods; said system comprising:

first means responsive to the occurrence of the leading edge of each of successive sync pulses for deriving (1) an initialize pulse IP isochronous with such leading edge, (2) a color carrier frequency $f_{cc}$ and (3) a sampling frequency $4f_{cc}$ which is phase locked with respect to one another and occur in synchronism with the horizontal scan-line frequency of said received television signal, whereby a horizontal scan-line period is equal to 910 sampling periods of $\frac{1}{4}f_{cc}$;

an analog-to-digital converter coupled to said first means and responsive to said C and Y components of said received television signal for converting said C and Y components to digital samples thereof, wherein each digital sample of said C and Y components occupies a sampling period of $\frac{1}{4}f_{cc}$; and a time-compressed IYQY multiplexed to NTSC video signal digital processor including a sequence generator and said digital decoder which processor is coupled to said first means and said analog-to-digital converter for deriving digital samples in NTSC format of the sum of Y and C in response to said initialize pulse IP, said sampling frequency $4f_{cc}$, and said digital samples of said Y and time-compressed C components being applied thereto, said sequence generator (a), in accordance with the respective ordinal values of the consecutive 910 $\frac{1}{4}f_{cc}$ sampling periods of a horizontal scan-line period that exists between successive initialize pulses IP signal, sequentially deriving a plurality of different control signals, and (b) deriving a phasing signal $\phi$ in response to the presence of said flag pulse for distinguishing between IY and QY horizontal scan-line periods.

16. The system defined in claim 15, wherein:

said given portion of both IY and QY horizontal scan-line periods occurs within a first given interval thereof which corresponds to the back-porch interval of an NTSC horizontal scan-line period, and said flag pulse occurs prior to said given portion but within said first given interval of an IY horizontal scan-line period;

said plurality of different control signals generated by said sequence generator include a read-interval (RI) control signal and a write-interval (WI) control signal;

said WI control signal occupies the sampling periods occupied by said time-compressed C samples of said given portion of both said IY and QY horizontal scan-line periods; and said RI control signal occupies the sampling periods that occur during a second given interval that corresponds to the active video portion of an NTSC format horizontal scan-line period.

17. The system defined in claim 16, wherein said digital decoder comprises:

a demultiplexer coupled to said analog-to-digital converter and controlled by said WI control signal for separating said time-compressed C samples and said Y samples;

a memory for storing C samples successively written therein at successive addresses thereof;

memory control means having said sampling frequency $4f_{cc}$, said WI control signal and said RI control signal applied thereto (1) for permitting successive time-compressed C samples which occur during successive sampling periods of a write interval to be written in said memory at successive addresses thereof, and (2) for reading out from said memory each of said C samples stored at each of said successive addresses thereof during each of successive sets of 2 n consecutive sampling periods (wherein n is an integer) of a read interval; and second means including a biphase select generator, a null word generator and a 2-dimensional interpolation filter, said second means having said phasing signal $\phi$, said sampling frequency $4f_{cc}$ and said RI control signal applied thereto for (1) effectively coupling said second means to said memory to permit the application of said read-out samples to the input of said second means only during said read interval, (2) decimating the respective read-out I sample occurring during each of said successive sets of 2 n consecutive sampling periods of an IY horizontal scan-line period to provide that read-out sample only during a first given ordinal one of the 2 n sampling periods of that set and to provide said null word during the remaining sampling periods of that set, (3) decimating the read-out Q sample occurring during each of said successive sets of 2 n consecutive sampling periods of a QY horizontal scan-line period to provide that read-out sample only during a second given ordinal one of the 2 n sampling periods of that set and to provide said null word during the remaining sampling periods of that set, said second ordinal one of the 2 n sampling periods being displaced by solely one sampling period from said first ordinal one of the 2 n sampling periods, (4) vertically interpolating the decimated samples of said IY and said QY horizontal scan-line periods with one another, and (5) horizontally interpolating the vertically interpolated samples of each horizontal scan-line period to substitute interpolated samples for each of the null-word sampling periods thereof.

18. The system defined in claim 17, wherein said first given ordinal one of said set of 2 n sampling periods is other than the first sampling period of said set and said second given ordinal one of said set of 2 n sampling periods is other than the nth sampling period of said set.

19. The system defined in claim 17, wherein said second means further includes a chroma processor having given characteristics for modifying the respective levels defined by said read-out samples in accordance with said given characteristics.

20. The system defined in claim 17, wherein:
said interpolation filter inserts a given delay between the sampled input and output of said second means;
delay means coupled to said demultiplexer for delaying said Y samples by said given delay; and
a digital adder for summing the delayed Y samples and the interpolated C samples that appear at the output from said second means.

21. The system defined in claim 15, wherein:
said flag pulse occupies sampling periods 23-32 of an IY horizontal scan-line period, and said WI control signal occupies sampling periods 41-134 and said RI signal occupies sampling periods 143-904 of both an IY and an QY horizontal scan-line period.

22. The system defined in claim 15 further including a digital-to-analog converter responsive to the digital samples in NTSC format from said digital processor for converting them to an NTSC analog form signal; and
an NTSC processing amplifier coupled to said first means and said digital-to-analog converter and responsive to said color carrier $f_{cc}$ and the leading edge of said sync pulse for inserting NTSC horizontal and vertical blanking signals and color burst to the NTSC analog form signal from the digital-to-analog converter for deriving a television signal in composite NTSC format.

* * * * *

UNITED STATES PATENT AND TRADEMARK OFFICE
CERTIFICATE OF CORRECTION

PATENT NO. : 4,602,274

DATED : July 22, 1986

INVENTOR(S) : ALFONSE ACAMPORA ET AL.

It is certified that error appears in the above-identified patent and that said Letters Patent is hereby corrected as shown below:

Column 5, line 33, "information" appears twice. Delete second occurrence.

Column 7, line 11, "GS" should be --G2--.

Column 7, line 19, "$\phi$" should be --$\bar{\phi}$--.

Column 7, line 20, "$\phi$ is high" should be --$\bar{\phi}$ is high--.

Column 7, line 21, "$\phi$ are shown" should be --$\bar{\phi}$ are shown--.

Column 8, line 34, "signal" should be --single--.

Column 11, line 48, "interpolted" should be --interpolated--.

Column 14, line 29, "integal" should be --integral--.

Column 14, line 48, "degignating" should be --designating--.

Signed and Sealed this

Thirteenth Day of January, 1987

Attest:

DONALD J. QUIGG

Attesting Officer

Commissioner of Patents and Trademarks